UNITED STATES PATENT OFFICE.

GEORGE M. MOWBRAY, OF NORTH ADAMS, MASSACHUSETTS, ASSIGNOR TO THE AMERICAN ZYLONITE COMPANY, OF NEW YORK, N. Y.

METHOD OF DRYING PYROXYLINE.

SPECIFICATION forming part of Letters Patent No. 349,659, dated September 21, 1886.

Application filed January 27, 1886. Serial No. 189,970. (No specimens.)

*To all whom it may concern:*

Be it known that I, GEORGE M. MOWBRAY, a citizen of the United States, residing at North Adams, in the county of Berkshire and State of Massachusetts, have invented new and useful Improvements in Methods of Drying Pyroxyline, of which the following is a specification.

Owing to the inflammable nature of dry pyroxyline when in a finely-divided state the ordinary means of desiccation, by means of a current of hot air, is dangerous, and several methods have in consequence been devised to remove adherent moisture. Pressure between folds of dry bibulous paper has been found effective, but it is a slow and expensive method. Compressing air to a small volume and absorbing the heat given out by compression, so as to cause the deposit of aqueous vapor dissolved in its original volume, and subsequent warming by passing through a copper coil surrounded by either steam or hot water is also an efficient method; but it involves an expensive plant consisting of air-pumps, steel reservoir capable of sustaining an immense strain, cooling and heating coils, and compels the necessity of economizing the desiccating air produced at great labor and expense.

My invention has for its object the drying of pyroxyline, &c., either in strips or skeins or in a finely-divided state; and it consists in depriving atmospheric air of aqueous vapor by reducing its temperature, arresting visicular moisture by caustic lime, warming the so-dried air by raising its temperature to a moderate extent, and thoroughly exposing the pyroxyline to a current of air treated as above described. Ground pyroxyline after draining and rinsing for fifteen minutes in a good centrifugal machine will be found to retain from thirty to forty per cent. of water, and while in that condition a temperature of 180° Fahrenheit is not injurious; but any particle that has lost its moisture commences to change at a temperature of 120° Fahrenheit. I therefore aim to limit my temperature for warming the air so as not to exceed 100° Fahrenheit, finding that air deprived of its moisture by ice, and then warmed to 100° Fahrenheit, while it is incapable of starting decomposition in any dry particles of pyroxyline, yet dries it thoroughly and very rapidly. Pyroxyline thus dried, if converted at once into a plastic compound by the well-known methods of mixing with camphor, alcohol, &c., digestion and mastication at a temperature not exceeding 130° to 140° Fahrenheit, does not develop acid, nor does it stain the bright metal of polished masticating rolls.

To enable others to carry out my invention, I will now describe suitable means, but wish it understood that I do not limit myself to any particular form or shape of contrivance to reduce the air to a low temperature, nor to any especial method of moving the air from where it is cooled to where its temperature is raised, and thence on to where it is brought into contact with the pyroxyline, the essence of my invention consisting in my mode of depriving atmospheric air of its aqueous vapor, then raising the temperature to a degree that is not capable of decomposing well-made pyroxyline, and, finally, bringing such warm dry air into intimate contact with the material to be dried.

The following means to effect the above object have given satisfactory results.

First, an ice-house filled with ice, fitted so that an air-draft may pass down through broken ice piled on a series of joists or gratings of an area proportioned to quantity of material to be desiccated.

Second, a narrow chamber adjoining ice-store, with inlet for cold air from ice-gratings at lower part thereof and outlet at a higher range with a series of joists or gratings on which can be readily piled lumps of unslaked lime.

Third, a fan-blower with its central inlet inclosed by a conductor leading from over the line gratings and a blast-conductor for delivering the cold air to a warming-chamber.

Fourth, a warming-chamber, fitted either with air-pipes of moderately-large area to receive the cold air, said air-pipes warmed by exhaust-steam from the motor that drives the fan-blower, or the chamber fitted with steam-pipes of moderately-large area to receive part of the exhaust-steam that issues from the steam-engine that drives the fan-blower. The advantage of using the exhaust-steam to warm the air instead of taking steam from an independent source is this: Whenever the engine stops and the fan-blower ceases to drive air there is no longer risk of heating the quiescent air to an undue degree of heat, as would be the case if still air remained for some time in contact with hot steam-pipes and were then suddenly driven on to the pyroxyline.

Fifth, suitable superficial area, either by means of an endless canvas belt receiving a regulated supply of pyroxyline moving in an inclosed space against the current of dried warm air, with final outlet or a series of trays of coarse cloth resting on wire-cloth set in alternate layers, so as to afford the easiest way for the current of warm air to escape by traversing the surface of the pyroxyline spread in thin layers on said trays.

The *modus operandi* is as follows: As soon as the engine moves, its exhaust-steam, or so much thereof as is diverted to that purpose, warms the pipes. These warm the air. The motion of the fan impelled by the engine draws cold air up through the lime-gratings, and necessarily to replace that air more air passes slowly down through the ice and its adjacent grating, said air precipitating its moisture onto the ice by contact therewith. The air thus drawn is now forced by the fan through the warming-chamber, and passes thence into whichever division of trays of moving canvas belting it is permitted to enter by suitable slides, and coming into contact with the pyroxyline dries it very rapidly. Various modifications of this system may be arranged according as the article to be dried will be more or less injured by being moved. For pyroxyline and grain, powders, &c., the belt system is more rapid; but meat, fruit, &c., which cannot readily be moved, requires, for instance, hooks to suspend meat, or trays to hold fruit. These details will be provided for as necessity requires.

Having thus described my invention, what I claim is—

1. The within-described method of desiccating pyroxyline, the same consisting in using warmed air which has been previously deprived of its moisture by passing it over lime, substantially as and for the purpose specified.

2. The within-described method of desiccating pyroxyline, the same consisting in using warmed air which has been previously deprived of its aqueous moisture by chilling, substantially as and for the purpose specified.

3. The within-described method of desiccating pyroxyline, the same consisting in using warmed air which has been previously deprived of its aqueous moisture and then passing it over lime, substantially as and for the purpose specified.

In testimony whereof I affix my signature in presence of two witnesses.

GEORGE M. MOWBRAY.

Witnesses:
HARRY S. MOWBRAY.
MERRITT T. WHITE.